UNITED STATES PATENT OFFICE.

GEORGE CLARKSON, OF PATERSON, NEW JERSEY, ASSIGNOR TO BENJAMIN KENT, OF SAME PLACE.

IMPROVEMENT IN PROCESSES OF COMPOUNDING PAPER-PULP.

Specification forming part of Letters Patent No. 171,099, dated December 14, 1875; application filed May 18, 1875.

*To all whom it may concern:*

Be it known that I, GEORGE CLARKSON, of the city of Paterson, county of Passaic and State of New Jersey, have invented a new and Improved Process for Compounding or Making Paper-Pulp, of which the following is a specification:

The nature of my invention consists in mixing waste paper, which has been previously cut up into small pieces, sulphuric acid, nitric acid, silk or cotton fiber prepared very fine, and boiling water.

The several ingredients and materials are proportioned about as follows, viz: Waste paper, four ounces; sulphuric acid, twenty drams, fluid; nitric acid ten drams, fluid; silk or cotton fiber, about one-third of bulk; boiling water sufficient to moisten properly, and the process of mixing and preparing the materials, being the process for manufacturing the paper-pulp, is as follows, viz: To prepare the compound cut the paper into very small pieces in any suitable manner, and by any suitable means; add sufficient boiling water to moisten. Next, pour on the acids mixed; gradually boil until the material is reduced to a fine pulp; neutralize the acids with carbonate of soda; strain and add the fiber.

The above quantities will suffice to make five ounces of paper-pulp.

The acids are useful in reducing the paper to pulp. It is not strictly necessary to neutralize the same, although I prefer doing so. The silk and cotton fiber is introduced to give tenacity and strength to the material after it is put to its proper use.

It is intended to use this material in the manufacture of boxes. The said boxes being formed by pressure in a mold or die, in the said manufacture a very tenacious and firm composition is absolutely necessary, and the material made by this process is peculiarly adapted to that purpose.

What I claim as new, and desire to secure by Letters Patent of the United States, is—

The process of making paper-pulp by mixing waste paper with silk or cotton fiber, and treating the same with sulphuric and nitric acids, as and for the purpose described and set forth.

GEORGE CLARKSON.

Witnesses:
WILLIAM KENT,
HENRY DERING.